(12) United States Patent
Wiskus

(10) Patent No.: US 12,722,798 B2
(45) Date of Patent: Sep. 1, 2026

(54) DISABLED AIRCRAFT TRANSPORT SYSTEMS

(71) Applicant: Disabled Aircraft Tools, LLC, Spring Park, MN (US)

(72) Inventor: Michael Wiskus, Spring Park, MN (US)

(73) Assignee: Disabled Aircraft Tools, LLC., Spring Park, MN (US)

( * ) Notice: Subject to any disclaimer, the term of this patent is extended or adjusted under 35 U.S.C. 154(b) by 172 days.

(21) Appl. No.: 18/378,528

(22) Filed: Oct. 10, 2023

(65) Prior Publication Data

US 2024/0217673 A1 Jul. 4, 2024

Related U.S. Application Data

(60) Provisional application No. 63/540,625, filed on Sep. 26, 2023, provisional application No. 63/414,396, filed on Oct. 7, 2022.

(51) Int. Cl.
*B64F 1/00* (2024.01)
*B64F 1/227* (2024.01)

(52) U.S. Cl.
CPC .................................... *B64F 1/227* (2013.01)

(58) Field of Classification Search
CPC .... B64F 1/227; B64F 1/02; B66F 3/35; B66F 3/40
See application file for complete search history.

(56) References Cited

U.S. PATENT DOCUMENTS 1,248,896 A 12/1917 Olson
2,070,960 A * 2/1937 Phillips .................... B66F 3/35 254/122
2,362,981 A 11/1944 Philemon
2,392,409 A 1/1946 Ray
2,608,312 A 8/1952 Day
2,610,750 A 9/1952 Hulbert
3,185,238 A 5/1965 Coates
3,583,723 A 6/1971 Nowell et al.
(Continued)

FOREIGN PATENT DOCUMENTS

CN 103874350 A 6/2014
CN 110406454 B 4/2022
(Continued)

*Primary Examiner* — Lee D Wilson
(74) *Attorney, Agent, or Firm* — Christensen, Fonder, Dardi & Busse PLLC; Douglas J. Christensen

(57) ABSTRACT

A dolly with an inflatable airbag stack for placement beneath a portion of a disabled aircraft enables the aircraft to be raised and the subsequent transport of the aircraft without requiring cranes or heavy equipment. An adjustable height rigid support structure may be received by the dolly, the rigid support structure having an aircraft support platform that may be positioned on the top of the inflatable airbag stack such that as the airbag stack is raised, the aircraft support platform engages the disabled aircraft. The airbag stack may be deflated such that the weight of the aircraft is carried by the rigid support structure. The dolly's bed or another dolly in a recovery system may also receive a flat tire of a disabled aircraft. The dolly may receive a support platform extending between a pair of beams, the airbag stack seating on the platform.

20 Claims, 16 Drawing Sheets

(56) References Cited

U.S. PATENT DOCUMENTS 3,586,187 A 6/1971 Wright
3,598,259 A 8/1971 Wright
3,720,422 A 3/1973 Nelson
3,946,886 A 3/1976 Robinson
4,061,310 A * 12/1977 Vetter ........................ B66F 3/35 254/93 HP
4,121,788 A 10/1978 McMahon
4,690,605 A 9/1987 Coccaro
4,854,803 A 8/1989 Coccaro
5,071,151 A 12/1991 Irwin
5,492,300 A * 2/1996 Riihiluoma ............... B66F 3/22 248/354.1
5,669,086 A * 9/1997 Garman ................... A61G 5/00 5/81.1 R
6,286,813 B1 9/2001 Coccaro
6,929,249 B1 * 8/2005 Kim .......................... B66F 3/35 254/93 H
7,070,167 B1 7/2006 Bacon et al.
7,097,406 B1 8/2006 Gang
8,475,108 B2 7/2013 Hamman
8,733,508 B2 5/2014 Bacon
10,378,222 B1 * 8/2019 Elanmati ................... E04G 1/22
11,161,695 B1 * 11/2021 Knight ...................... B66F 3/40
11,198,518 B1 * 12/2021 Knight .................... B64F 1/228
11,260,992 B1 3/2022 Wiskus
2009/0278098 A1 11/2009 Bacon
2010/0117039 A1 5/2010 Perrett et al.
2014/0037409 A1 2/2014 Winters
2014/0217343 A1 8/2014 Sefrin
2018/0273360 A1 9/2018 Nasrin
2022/0371865 A1 * 11/2022 Horn ......................... B66F 3/35
2024/0217673 A1 * 7/2024 Wiskus ................... B64F 1/227

FOREIGN PATENT DOCUMENTS

GB 1105364 A 3/1968
GB 2195399 A 4/1988
JP S59163230 A 9/1984
WO WO-2022130069 A1 * 6/2022 ................ B66F 3/35

* cited by examiner 100
101
102
104
105
106
107
110
112
113
114
120
122
124
125
126
130
132
142
144
146
148
200
201
202
204
206
208
210
220
301
304
306
308
390
400
402
404
406
408
410

800
808
806
802
806
1610
142
102
144
104
106

808
812
810
804
818
146
102
816
146
142
814
806.1
806.2
702
100

1572
1574
1560
1565
1564
1575
1571
1596
1568

1574
1564
1595
1576
1560

1595
1564
1560
1596
1571

1571
1564
1590
1560
1572

1590
1560
1500

1560
1500

1590
1500
1564

1590
1500

DISABLED AIRCRAFT TRANSPORT SYSTEMS

CROSS-REFERENCE TO RELATED APPLICATIONS

The present application claims the benefit of U.S. Provisional Application No. 63/414,396 filed on Oct. 7, 2022 and U.S. Provisional Application No. 63/540,625 filed Sep. 26, 2023. Both of the above are incorporated herein by reference.

FIELD OF THE DISCLOSURE

The present disclosure relates to systems for moving disabled aircraft. More specifically, it relates to systems including aircraft dollies with pneumatic lifting systems that can support portions of a disabled aircraft and allow movement of the disabled aircraft.

BACKGROUND OF THE INVENTION

In aviation, certain circumstances arise wherein an aircraft must be moved without rolling on one or more of its tires. One common example is an aircraft disabled by a flat tire or a broken landing gear. If an airplane is disabled on a taxiway or, worse, on a runway, it can block that thoroughfare. This happens often enough to be, in the best case, a nuisance and, in the worst, a significant safety hazard. Often, part or all of the airport must be closed until the disabled airplane can be cleared. Often, this is an intolerable length of time, especially if the failure must be repaired on an active runway or taxiway. Furthermore, an in situ repair might be difficult or impossible. Similarly, circumstances arise where an aircraft must first be lifted in order to be moved for repair. For example, a damaged landing gear might cause an aircraft to be off balance or even be resting on, for example, a wing or fuselage. In such circumstances, the aircraft must be lifted before it can be transported. However, this can often require substantial equipment, such as cranes, which are expensive and are not readily available, causing delays in preparing a disabled aircraft for transport. This may be particularly troublesome when the aircraft is an area that can cause further delays for airport operations, such as blocking a runway making it inaccessible to other aircraft.

Wheeled vehicles of all kinds are susceptible to flat tires and other breakdowns, and transport dollies of various designs to move them are known in the art. Representative examples are shown in U.S. Pat. No. 1,248,896 to Olson, U.S. Pat. No. 2,608,312 to Day, U.S. Pat. No. 3,583,723 to Nowell, et al, and U.S. Pat. No. 7,097,406 to Gang, and U.S. Pat. No. 11,260,992 owned by the owner of this application. Said patents are incorporated by reference herein for all purposes.

Some existing devices provide for lifting disabled aircraft. One example is disclosed in US Patent Application Publication No. 2014/0217343 to Sefrin. Some systems allow for some mobility of a lifting apparatus. One example is disclosed in U.S. Pat. No. 11,161,695 to Knight et al. All of the above patents and patent publications are incorporated by reference herein for all purposes.

There remains an unmet need for an aircraft transport system for disabled aircraft that can be deployed quickly and safely lift and stabilize an aircraft, and/or applied to an aircraft tire and wheel, and can be applied and used if necessary by a single operator. A dolly that includes a lifting system which can be rapidly transported and deployed and that can be used both with or without a towbar, including with or without a motorized tug, would be well received by the airport and airline industries.

SUMMARY OF THE INVENTION

Various embodiments of the present disclosure include a disabled aircraft transport system that includes one or more dollies suitable for receiving the wheel of an aircraft with a flat tire and that also may provide aircraft lifting and support means and that allows the lifted and supported aircraft to be towed. One dolly may have a lower bed region between a pair of side beams that may receive the aircraft wheel with a flat tire, a forward mounted winch may position the tire, wheel and landing gear within the bed region. The lifting means may comprise a raisable airbag column with a footprint and lower portion that may be conformingly sized for the bed region of at the dolly. The dolly providing positioning of the raisable airbag column under the disabled aircraft, such as at a wing or under the fuselage. When positioned, the airbag column may be inflated to an engagement position and then to a further elevated position by further inflating the airbag column, thereby lifting the aircraft by lifting the specific portion of the aircraft under which the dolly with the lifting means is positioned. In embodiments, the airbag column is stabilized in position by a plurality of straps on at least each side of the airbag column that extend downward and outwardly from the airbag column and are attached to the dolly. The airbags may have internal webs for controlling the outward expansion and the shape of the aircraft. A lifting plate may be positioned on a top of the lifting means such that at the engagement position the lifting plate engages the aircraft portion under which the lifting means is positioned. In embodiments, the dolly may have receptables positioned on the side beams such that when the aircraft is raised to a desired elevation, adjustable height posts may be installed at the receptacles to extend to and connect to the lifting plate thereby providing a rigid support structure supporting and rigidly securing the raised aircraft with respect to the dolly. Other adjustable height rigid support structures may be utilized on the dolly such as scissor mechanisms and the like. In embodiments, the airbag column may be deflated to allow the rigid support structure extending form the dolly to carry the weight of the aircraft. Aircraft securement straps may extend from the airbag column, the lifting plate, and/or the rigid support structure, about the wing or fuselage, or other portion of the aircraft raised, to secure the aircraft to the airbag column, and/or the rigid support structure, and consequently the associated dolly.

In embodiments, the lifting plate may be configured as a cradle for receiving a portion of the aircraft, for example the fuselage. In embodiments different sized cradles may be provided along with padding components such as padded blankets, foam sheets, foam components, or smaller inflatable pad units. One or more cradles may be available for different sized aircraft and/or for placement on different locations on the aircraft, particularly at the fuselage, and/or on the wings. The lifting plate may be angularly adjustable by the adjustable height posts.

The disabled aircraft may have, for example, a non-functional landing gear and a flat tire on a separate landing gear. The disabled aircraft recovery system may include a plurality of dollies such that a separate dolly is available for receiving the landing gear with the flat tire. The disabled recovery system may comprise a kit with the plurality of dollies, one or more lifting means receivable by particular dollies, the lifting means including raisable airbag columns, a compressor with a pneumatic control system, air hoses, and an adjustable rigid support structure to be erected on the dolly, including one or more cradles that may engage underside portions of the aircraft, the cradles supported by adjustable height support structures, such as posts received by the one or more dollies, The adjustable rigid support structure providing a more rigid support of the disabled aircraft after it is raised by the lifting means such as the airbag column.

When the disabled aircraft is secured to the dolly, the aircraft may be towed by one or more tow vehicles connecting to the respective dollies and/or aircraft. When more that one dolly is utilized for moving the disabled aircraft, the dollies may be linked together.

A feature and advantage of embodiments is a dolly with a bed region is provided that may receive a landing gear with a flat tire, and alternatively may receive a raisable airbag column for raising the disabled aircraft. A feature and advantage of embodiments is the dolly may also receive or have a rigid support structure that more rigidly secures the disabled aircraft with respect to the dolly after the disabled aircraft is raised by the airbag column.

A feature and advantage of embodiments are systems that may be rapidly deployed to elevate and transport a disabled aircraft without requiring additional heavy machinery to be brought in and positioned such as cranes and the like. Particularly in areas such as airport runways, disabled aircraft my cause traffic delays that can be extremely disruptive to both passengers and airlines. Even small delays in schedules may be very expense for airlines to accommodate.

A feature and advantage of embodiments are transport systems that permits a disabled aircraft to be transported without causing further damage. Raising the aircraft before and during transport prevents excess damage to portions of the aircraft that would otherwise be dragging along the ground.

A dolly for lifting an aircraft from underneath the aircraft includes a steel frame, a plurality of castors, and a pneumatic lifting system. The steel frame includes a pair of side beams that are substantially parallel to each other and a forward bridging portion providing a U-shape when viewed from above. A receiving platform extends between the pair of beams to the forward bridging portion defining a lower bed region. The plurality of castors are attached to each of said pair of beams. The pneumatic lifting system includes an inflatable vertically erectable airbag system having a stack of one or more airbags. In embodiments, the airbag system includes a plurality of joined and vertically stacked airbags. The airbag system is erected atop the airbag receiving platform, the stack of airbags having a width substantially conforming to the width between the innermost vertical wall portions of the pair of beams. The stack of airbags includes a plurality of individual airbags stacked one atop another. Each of the plurality of individual airbags is configured to transition from a lowered configuration to an extended raised configuration.

In embodiments, each of the pair of beams includes a retaining bracket configured to receive a first end of an airbag retaining strap. Each of the plurality of individual airbags is configured to receive a circumferential strap around an upper portion of the individual airbag, a second end of the airbag retaining strap being affixed to the circumferential strap. In embodiments, each of the pair of beams includes two retaining brackets. In embodiments, each of the individual airbags is associated with a set of four matched airbag retaining straps. In embodiments, each retaining strap in the set of matched airbag retaining straps has the same length. In embodiments, each set of airbag retaining straps has a length that is different from one another, such that the set of straps associated with the individual airbag closest to the airbag retaining platform has the shortest length and the set of straps associated with the individual airbag farthest from the airbag retaining platform has the longest length.

In embodiments, when each of the individual airbags are fully inflated, each of the airbag retaining straps are taught. In embodiments, the frame is adapted for selective attachment to a detachable towbar for maneuvering the dolly. In embodiments, the dolly includes structure for selectively mounting a detachable tow bar to a forward end or a rearward end of the dolly. In embodiments, the dolly is in combination with a detachable tow bar.

In embodiments, a support platform may extend across the pair of side beams, the platform seating on the side beams and also having structure, such as legs, that extend downwardly from the platform to engage the upper surface of the lowered bed. The support platform may then receive a the airbag system. In such cases, the platform provides greater surface area that the surface area of the lowered bed for receiving the airbag stack and also reduces the height that the airbag must extend to lift the aircraft to a desired height.

In embodiments, the system further comprising an inflation system configured to inflate or deflate each of the individual airbags. In embodiments, each individual airbag may be inflated with the same volume of gas. In embodiments, at least two individual airbags are inflated with a different volume of gas. In embodiments, the system includes a second dolly comprising an inflation system configured to inflate or deflate each of the individual airbags. In embodiments, the inflation system comprises a compressor, a plurality of valves, a manifold, and a plurality of air lines.

In embodiments of the invention, a method of clearing a disabled aircraft from a runway includes: providing a dolly with an airbag system; positioning the dolly with each of the individual airbags in a deflated configuration beneath a lowered portion of the aircraft; raising the lowered portion of the aircraft by inflating at least one of the individual airbags; continuing to inflate the stack of airbags until the lowered portion is at the desired height; and towing the dolly and aircraft from the runway while maintaining the inflated stack of airbags under the lowered portion of the aircraft. In embodiments, the lowered portion is a wing. In embodiments, the lowered portion is a fuselage.

In embodiments, the method may further include providing an aircraft dolly with a pneumatic lifting means; positioning the aircraft dolly beneath a portion of the disabled aircraft; elevating the aircraft, and towing the aircraft dolly with the elevated aircraft. In embodiments, the method may further include the steps of providing a second aircraft flat tire dolly; positioning the second aircraft flat tire dolly beneath a second landing gear with a flat tire; and towing the second aircraft flat tire dolly, the first aircraft dolly.

A system for raising and towing a disabled aircraft may be stored together at an airport to facilitate rapid deployment during an emergency. The system includes a first aircraft dolly having a tow bar, a second aircraft dolly having a tow bar, an airbag system conforming to the first aircraft dolly, a compressor, tubing configured to attach between the compressor and the airbag system; and a rigid aircraft support assembly. The system may further include a first tow vehicle configured to receive the first tow bar and further configured to tow the first aircraft dolly; and a second tow vehicle configured to receive the second tow bar and further configured to tow the second aircraft dolly.

In embodiments, the compressor is mounted on a forward portion of the first aircraft dolly and the airbag system is disposed on a platform of the first aircraft dolly.

In embodiments, the rigid aircraft support assembly includes at least four telescoping legs. The first aircraft dolly is configured to receive a lower portion of each of the at least four telescoping legs. The rigid aircraft support assembly further includes an aircraft support platform. In embodiments, the aircraft support platform is planar. In embodiments, the aircraft support platform is concave. In embodiments, the aircraft support platform includes a compressible layer disposed on an upward facing surface. The compressible material is configured to be in contact with the disabled aircraft during transport.

Embodiments of the invention can be used with a variety of aircraft and vehicle types and can be formed of various sizes and materials. Various changes and modifications will be apparent to those of ordinary skill upon reading this disclosure, all without departing from the spirit and scope of the disclosure. Accordingly, this summary, the drawings, and the detailed description are to be regarded as illustrative in nature and not restrictive.

DETAILED DESCRIPTION

Figures 1, 2, 3, 4:
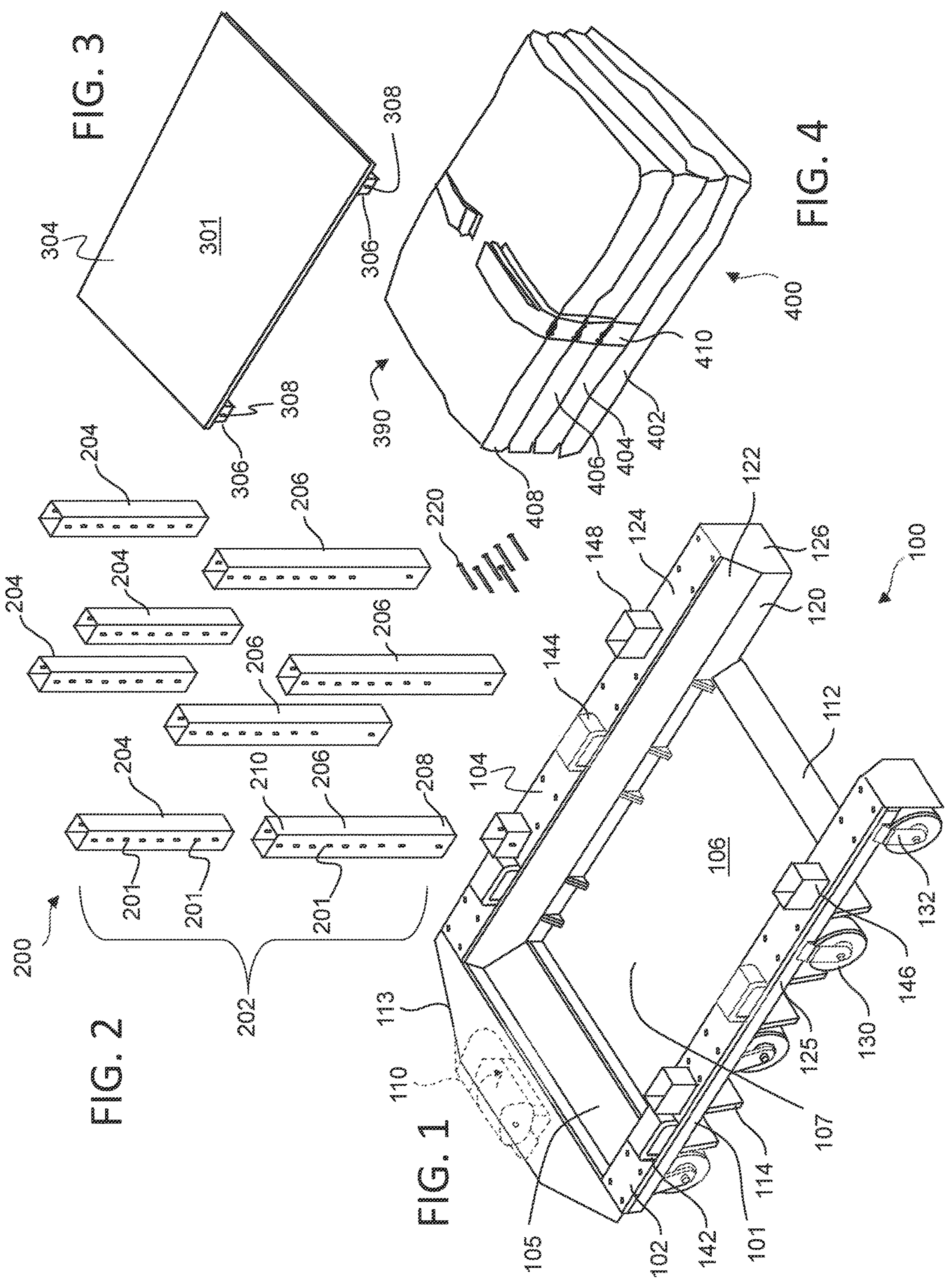
FIG. 1 is a perspective view of a dolly suitable in accord with embodiments of the disclosure.
FIG. 2 is an exploded view of post components receivable by the dolly of FIG. 1.
FIG. 3 is a perspective view of a lifting plate in accord with embodiments.
FIG. 4 is a perspective view of an airbag assembly sized to be receivable in the bed of the dolly of FIG. 1.

Referring to FIG. 1, a dolly 100 suitable for receiving flat tires of landing gears of aircraft is depicted. The dolly 100 has a steel frame 101 having two longitudinally extending side beams 102, 104 and a forward bridging portion 105. A downwardly recessed platform 106 defining a lower bed region 107 extends between the side beams and to the forward bridging portion. To support substantial loads, such as large aircraft, platform 106 may include two vertically spaced steel plates with support members therebetween and welded to both plates. Lead-in ramp 112 is disposed to guide an aircraft tire from the underlying surface up onto platform 106. At the opposite end of ramp 112, forward support 113, generally at the same elevation as the side beams, connects the side beams and provides structure to support additional components, such as a winch, batteries, and a compressor, and bracket and/or to provide a towbar attachment point. A winch 110 is illustrated on the winch platform positioned at the same plane as the top surfaces of the beams. In embodiments, support 113 may support a compressor and associated components, such as tubing and the like, as discussed in further detail below.

The frame 101 of dolly 100 additionally includes a plurality of angled brackets or gussets 114 extending on opposite lateral sides of platform 106 to support platform 106. In embodiments, gussets 114 may provide support for the support plates making up platform 106. Each beam 102, 104 includes a plurality of forwardly-rearwardly extending elongate wall portions defining a C-shape in cross section and including a substantially vertical innermost wall portion 120 extending upwardly from platform 106, angled wall portion 122 extending from portion 120 over to top horizontal wall portion 124, and outermost wall portion 125. Wall portions 122 can be provided with apertures for receiving adjustable stops. End plates 126 substantially close off the ends of beams 102, 104. Beams 102,104 are generally mirror images of one another.

Dolly 100 includes a plurality of wheels 130 or casters disposed at each side of the platform for rolling dolly 100 on an underlying surface. Angled brackets 114 are disposed at each side of platform 106 between wheels 130. Outer portion 125 includes slots for accommodating wheel flanges 132 for attaching wheels 130 to beams 102, 104. As shown, dolly 100 includes eight wheels, four on each side. Dolly 100 may include more or fewer wheels as necessary. Increasing the number of wheels permits dolly 100 to be used with heavier aircraft. the wheels are generally known as castors and can be swivel castors, about a vertical axis, or non-swiveling, that is fixed castors. Typically, on each side one or two castors with swivel and the rest will be fixed.

Dolly 100 may have forklift loops 144, 146 added to the beams 102, 104. A winch 110 is illustrated on the winch platform positioned at the same plane as the top surfaces of the beams. The weight carrying capacity of 75,000 lbs. is facilitated in part by the thick steel, double walled aircraft wheel receiving platform, and five castors on each beam. Dolly 100 can be removed from beneath the aircraft tire by removing the winch rigging and the front adjustable stop, then simply rolling the airplane back onto the ground. Alternatively, the aircraft can be jacked up to allow dolly 100 to be rolled out from under the tire.

Dolly 100 may have post receivers 146, 148 added to the beams 102, 104. As shown, two post receivers are located on each of the two beams, providing four total post receivers. Post receivers 146, 148 may include apertures for receiving fasteners. Additional post receivers may be added, permitting for the use of additional posts or support legs.

Referring to FIGS. 2 and 3, a rigid airplane support structure may include a set of support posts 200 and a support platform 301. In embodiments, a support post 202 has an upper leg 204 and a lower leg 206. Upper and lower legs may be tubular columns. In embodiments, upper and lower legs have a rectangular cross section. In embodiments, upper and lower legs have a circular cross section. Upper and lower legs 205,206 may include apertures 201 for receiving fasteners. In embodiments, a plurality of apertures extends in a vertical column along a first wall of the leg. In embodiments, a matching set of apertures extends along a wall of the leg. Accordingly, a faster may enter through an aperture in the first wall, pass through a central cavity of the leg, and extend out from the aperture in the opposing wall. Fasteners 220 may be nuts, bolts, pins, or the like.

Lower leg 206 has a bottom portion 208 and a top portion 206. Bottom portion 208 is configured to interface with post receivers 146, 148. Bottom portion 208 may fit within post receiver 146, 148 or, conversely, post receiver 146, 148 may fit within bottom portion 208. Once bottom portion 208 and post receiver 148 are aligned, fastener 220 maybe be slid through the corresponding structures, securing the lower leg 206 to dolly 100. Upper leg 204 is configured similarly to lower leg 206, having a first column of apertures 201 along a first wall and a corresponding column of apertures along an opposing wall. Upper leg 204 may have a smaller or a larger width or diameter than bottom leg 206 such that upper leg 204 may be received within the cavity of bottom 206, or bottom leg 206 may be received in a central cavity of upper leg 204. Once positioned one within the other, upper and lower legs 204, 206 may be fixed to one another with fastener 220. Accordingly, support post 202 is a telescoping column with a variable height. In embodiments, the legs may be steel, metal, metal alloys, extruded, or the like.

The rigid support assembly may be used to support a damaged aircraft while it is towed from a runway or otherwise maneuvered for improved stability. An upward facing surface 304 of the support platform 302 may have an additional padding layer so as not to damage the aircraft. Padding layer may also be somewhat compressible or malleable to further conform to the contour of the aircraft surface being supported. For example, padding layer may be a high-density foam. The padding may be integrated with the plate or separate. In embodiments, the legs of the rigid structure may be tubular. In embodiments, a downward facing surface of the support platform 301 may include structure to interface with the tubular legs. For example, platform may have sockets, brackets, or projections 306 that conform to the tubular upper legs 204, such that the protrusions 306 fit within an opening of the upper leg 204 or surround an end of the leg 204. Protrusions 306 may further have apertures 308 configured to receive fasteners 220 to secure support platform 301 to legs 202. Other rigid support structure may be utilized as well.

Referring to FIG. 4, a pneumatic lifting system 390 includes a compact deflated airbag stack 400 that may be placed on the dolly platform 106. In an embodiment, the airbag stack having a length and width generally conforming to the platform 106 of the dolly bed such that the airbag stack 400 fits snugly within the recess defined by the platform 106 the outside beams 102, 104 of the dolly 100. Other embodiments are described below with reference to FIGS. 28A-32. The airbag system 400 may include a stack of separably inflatable airbags 402, 404, 408, 410. In embodiments, all airbags 402, 404, 408, 410 in the system 400 may have generally the same dimensions. In embodiments, all airbags in the system may have generally similar lengths and widths, while have varying heights when fully inflated. Accordingly, an operator has complete control over an overall height of the inflated airbag stack, such that the same system could be used for aircraft having varying heights. Similarly, the same airbag stack could be placed in different locations about an aircraft. For example, an airbag stack deployed beneath an aircraft wing might need to be inflated to a greater height to offer support than an airbag stack deployed beneath the fuselage. Each airbag 402, 404, 408, 410, or particular airbags, may be associated with a set of straps 412, as explained in further detail below.

Figure 5:
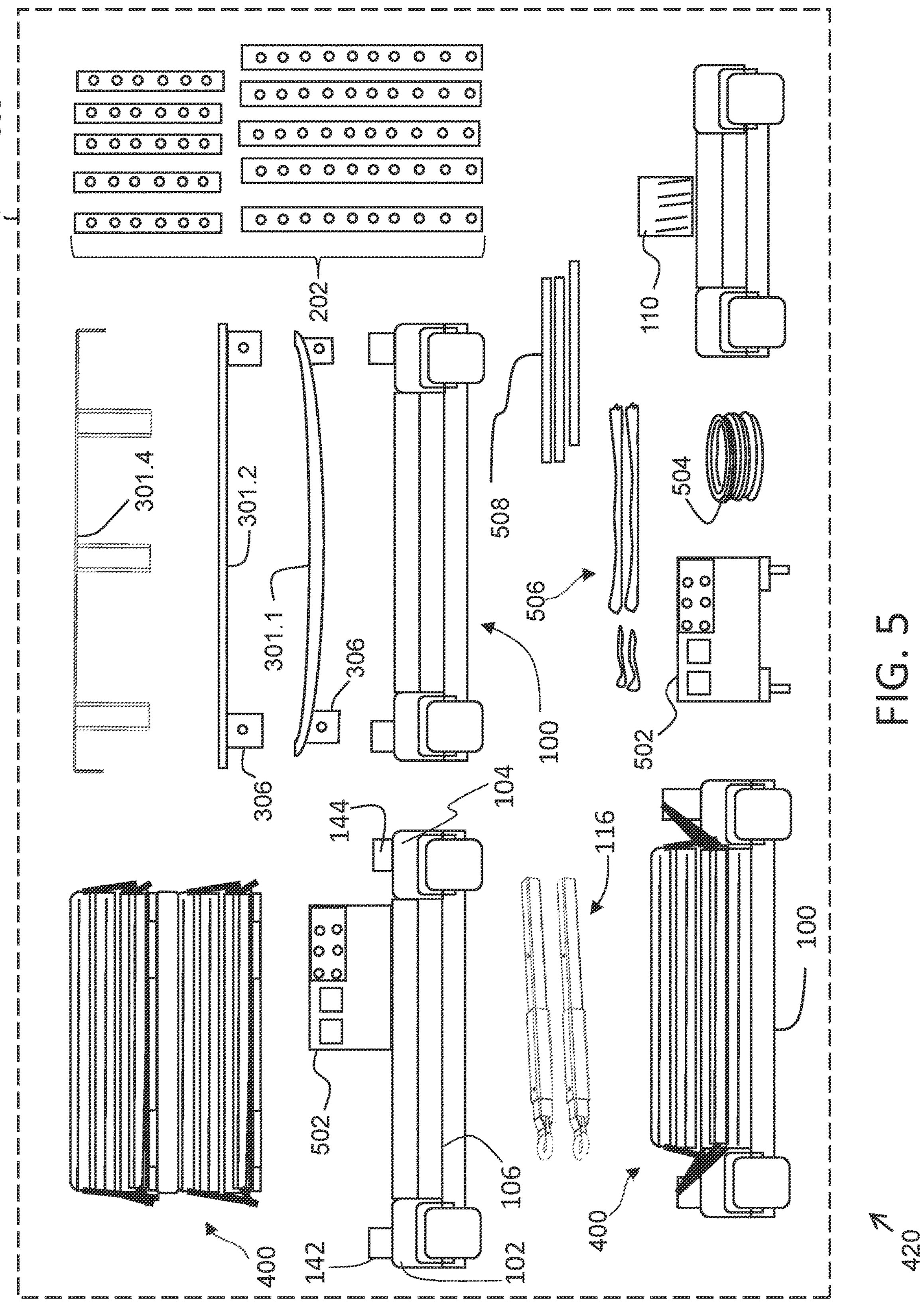
FIG. 5 is a collective view of components of a disabled aircraft moving system in accord with embodiments of the disclosure, such a system may be stored as a kit in an airport building.

Referring to FIG. 5, a collective set 420 or kit of components of a disabled removal system is depicted that is essentially a highly variable system for handling complex aircraft disablements and moving the aircraft out of blocking or dangerous positions. The system Components include dollies 100, towbars 116, airbag stacks 400, support platforms 301.1, 301.2, 301.4, dolly 100, adjustable height rigid support structure 202 componentry, compressor 502, tubing 504, plane attachment straps 506, cushioning pads 508, and winch 110. As shown, support platforms 301.1 and 301.2 may have various profiles to better conform to portions of the disabled aircraft. In one embodiment, platform 301.1 may have a curved profile to better conform to and support a fuselage of the aircraft. In other embodiments, platform 301 may be generally flat to accommodate the pitch of a wing. In embodiments platform 301.2 may be generally flat. It should further be noted that platform 301 may be angled to match the aircraft by setting telescoping support legs 202 at differing heights from one another. Support platform 301.4 may be a bridging support platform that seats directly on the dolly for supporting the airbag stack or other implements or components. See discussion below with reference to FIGS. 24-33. Compressor 502 may be placed on or integrated with dolly 100. In some embodiments, compressor 502 may be placed on a separate dolly or other support vehicle and kept within proximity of the airbag stack. The dashed line may represent an airport facility 505 or room where the collective set 420 is retained for emergency use.

Embodiments of the invention are sturdy and durable, being constructed for example of 5⁄16 inch or 5⁄8 inch or greater steel, welded solidly together. In the case of pivoting wheels or casters, it can be desirable to ensure that all casters disposed at the corners of the dolly, at least, are pointed in the direction of the tow before towing begins, to avoid binding or undue stress on the casters. It also can be desirable for enhanced stability to leave the towbar attached to the dolly during winching or other movement of the aircraft tire onto the dolly. It will also be appreciated that during such winching or other movement, the aircraft tire may roll with respect to the dolly, the dolly may roll with respect to the tire, or both movements may occur. In any case, relative movement between the dolly and the aircraft tire occurs to move the aircraft tire into the channel and secure the tire on the platform of the dolly, for towing.

Figures 6, 7:
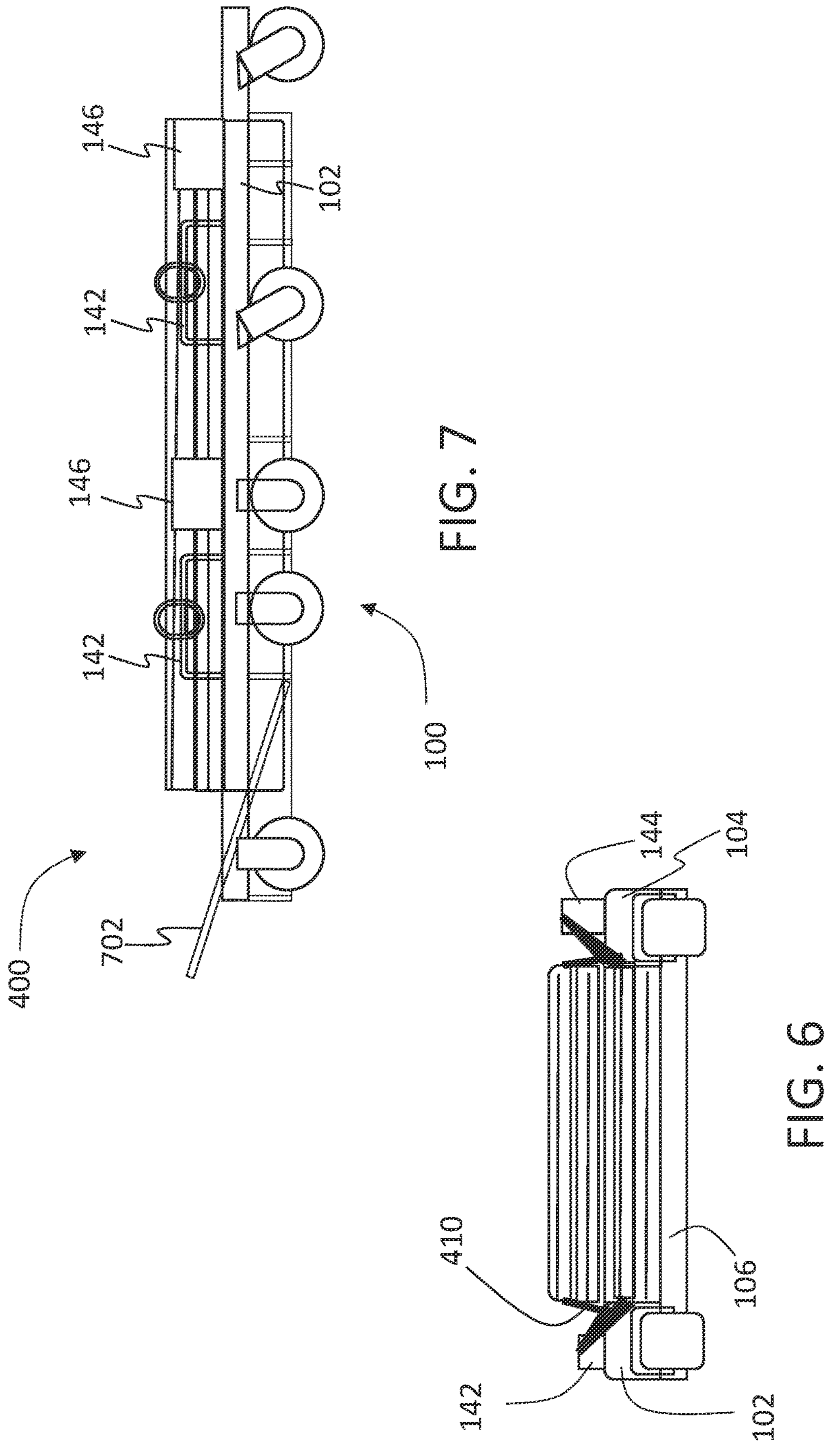
FIG. 6 is a front elevational view of a dolly with lifting airbags in accord with embodiments of the disclosure.
FIG. 7 is a side elevational view of the dolly of FIG. 6.

Referring to FIGS. 6 and 7, a deflated airbag stack may be placed on the dolly platform, between beams 102, 104. The airbag stack having a footprint that corresponds to the recessed dolly platform. Straps 410 may be secured to fork loops 142, 144 or other structure on the dolly. Tow bar 702 projects beyond a forward end of the dolly and is configured for use with a tow vehicle to tow the dolly. In some embodiments, tow bar 701 may be manually operated to maneuver the dolly.

Figures 8, 9:
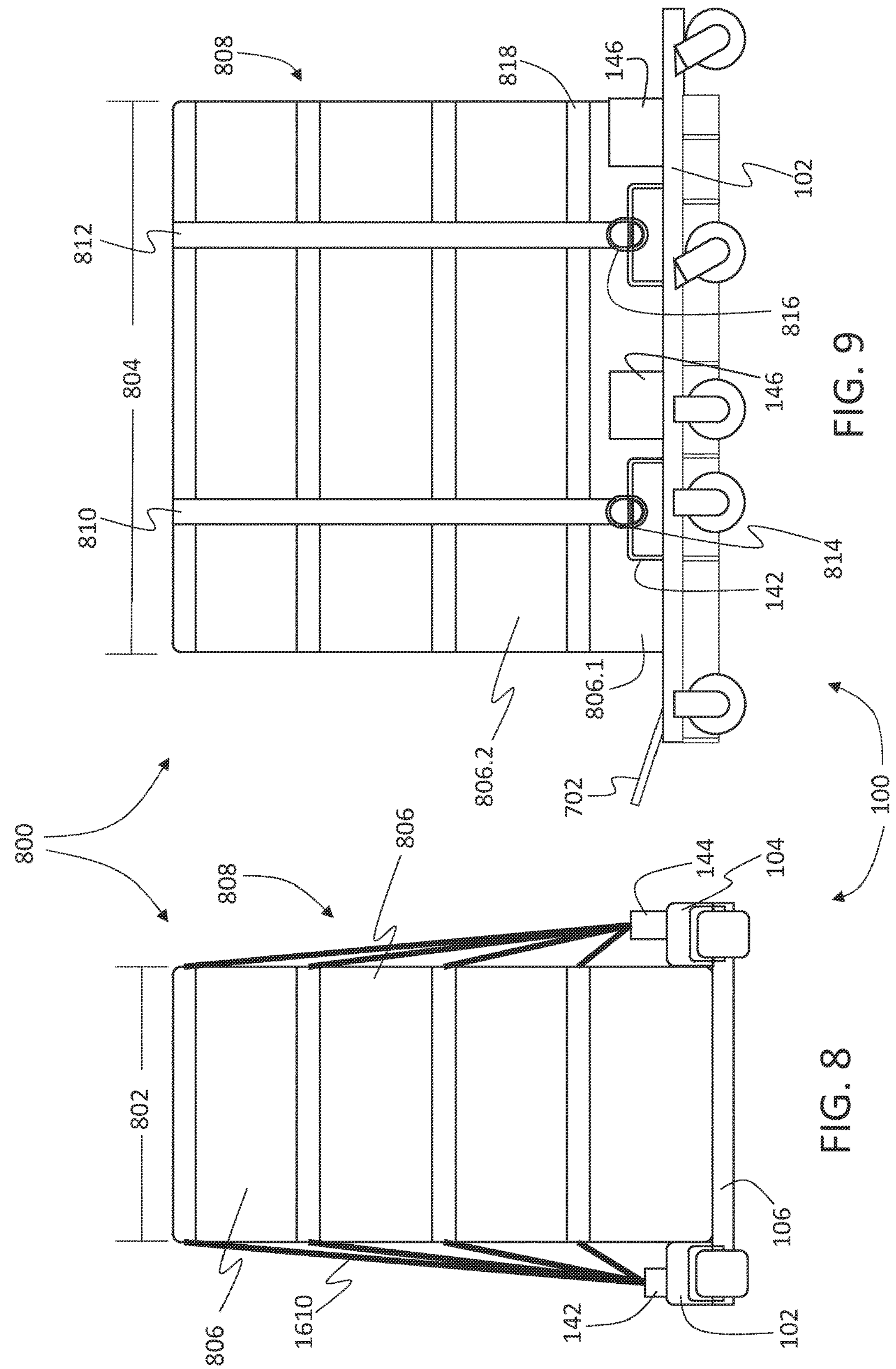
FIG. 8 is a front elevational view of the dolly with lifting airbags of FIGS. 5-7 in an erected position.
FIG. 9 is a side elevational view of the dolly with lifting airbags of FIGS. 5-7 in an erected position.

Referring to FIGS. 8 and 9, the airbag stack 800 may be inflated while the system remains on the dolly. A strap system 808 adds stability to the inflated stack of airbags 800. In embodiments, the strap system 808 creates a webbing around the around the airbags. Each individual airbag 806 in the airbag stack 800 is secured to at least each of the pair of dolly beams 102, 104. In embodiments, each airbag 806 is secured at four points. In embodiments, each airbag is secured at least at a forward portion and a rearward portion of the airbag.

In embodiments, each individual airbag may be associated with two retaining straps 810, 812. Each strap 810, 812 may have an end 814, 816 configured to attach to one of the forklift brackets 142, 144. As such, the strap may have a first end secured to a first bracket on a first beam, extend over an upward facing surface of the individual airbag, and have a second end secured to a bracket on the second beam. In embodiments, each individual airbag may be associated with four straps, where each retaining strap has a first end secured to a bracket on a dolly beam and an opposite end affixed to the individual airbag. In embodiments, the second end of the retaining strap may be affixed to a circumferential strap 818 that surrounds an upper portion of the individual airbag. In embodiments, the circumferential strap 818 may surround both the upper portion of a first airbag 806.1 and the lower portion of an adjacent airbag 806.2, thereby offering some additional structural support to the system. In embodiments, a tarp, webbing, sheet, or similar covering may cover the upward facing surface of the individual airbag, and the second end of the strap may be affixed to the tarp. It will be understood that more or fewer straps may be incorporated into the strap system, and more brackets may be added to the dolly beams for additional mounting points. Straps may have any combination of fixed or removable connection points. For example, straps may use hooks, zippers, carabiners, tie downs, hook and loop, or the like. In embodiments, straps may be permanently affixed to the airbags, tarps, other straps, or the like by stitching, glue, or the like. In embodiments straps may be woven, fabric, rope, or the like Each restraining strap associated with the same individual airbag may be part of a set, and each strap in the set may have the same length. Straps in different sets, that is, straps associated with different individual airbags in a system, may have different lengths. Accordingly, shorter straps may be associated with individual airbags at or near the bottom of a stack of airbags, whereas longer straps may be associated with individual airbags at or near the top of a stack of airbags. As such each retaining strap is taught when the airbag stack is fully inflated, creating a system that is straight and not prone to leaning or tipping. Maintaining a straight airbag stack is important for proper positioning and lifting of the aircraft. Systems lacking any such structure are prone to tiling or slipping and may not effectively lift an aircraft. Internal webs in the bags may help stabilize the airbag column. See U.S. Pat. Pub. No. US 20100117039, incorporated by reference herein for all purposes.

Figures 10, 11:
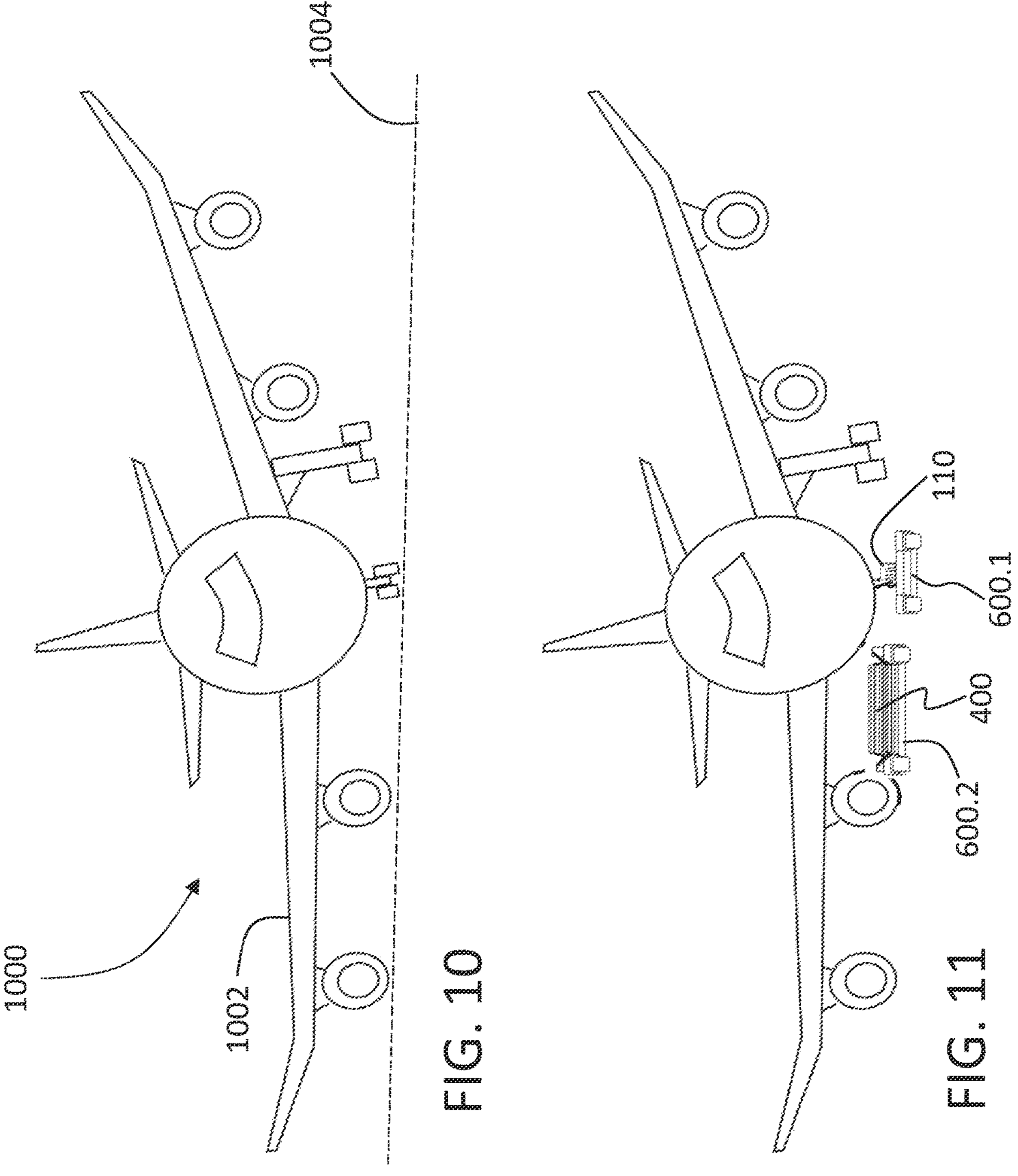
FIG. 10 is a view of a disabled aircraft with a collapsed or undeployed landing gear.
FIG. 11 is a view of the disabled aircraft of FIG. 10 with a dolly having lifting airbags and a dolly for receiving the front landing gear with a flat tire.
Figure 12:
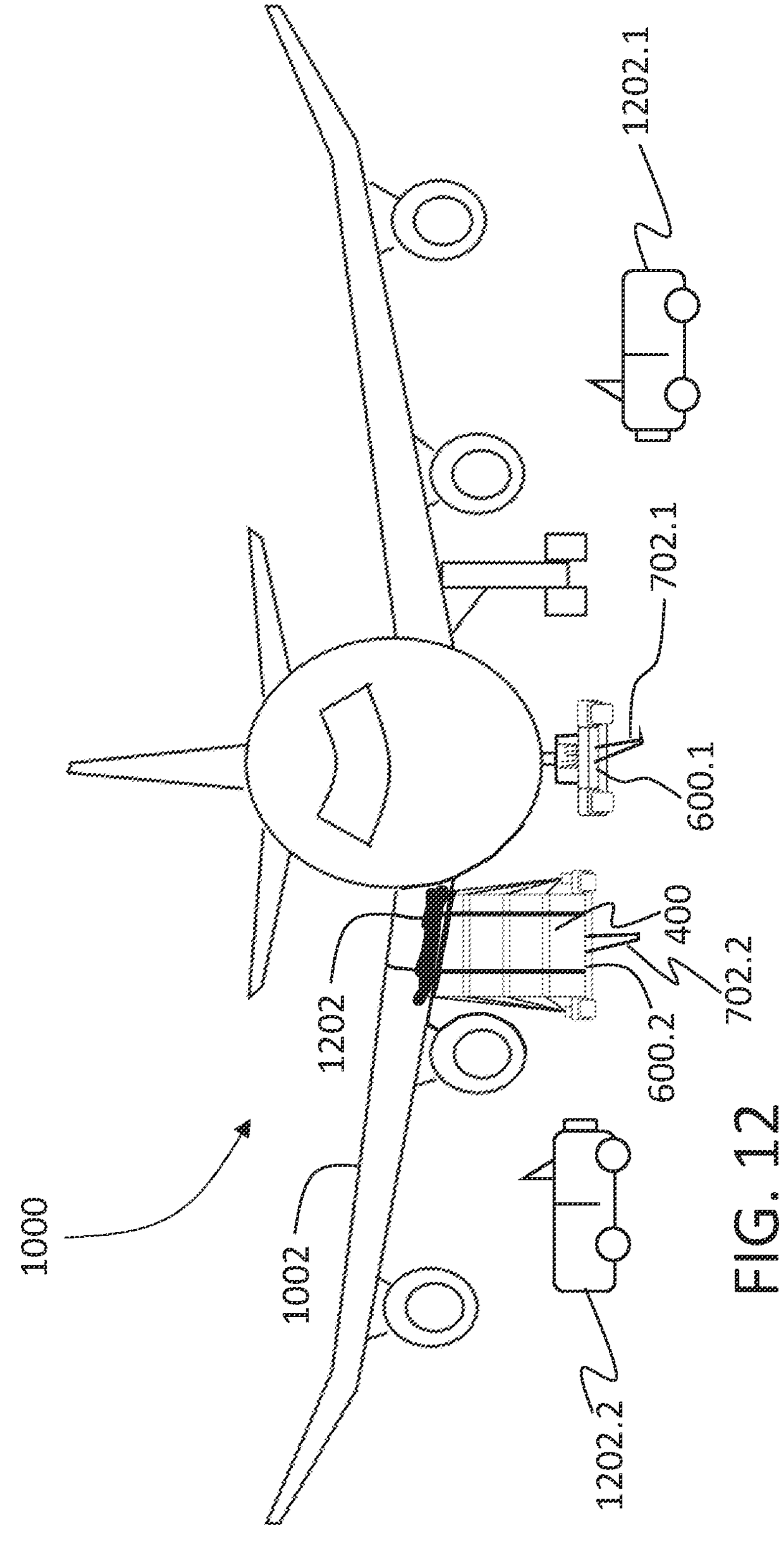
FIG. 12 is a view of the disabled aircraft of FIGS. 10 and 11 with the wing lifted and the front landing gear in a dolly, the aircraft ready to be towed by tow vehicles.

Referring to FIGS. 10-15, a disabled aircraft 1000 is shown being raised by a disabled aircraft transport system so that the disabled aircraft 1000 may be moved. As shown in FIG. 10, aircraft 1000 is missing a landing gear and has a wing 1002 resting on the ground 1004. A first dolly 600.1 with a winch 110 may be placed beneath the fuselage and the winch can be used to pull the landing gear onto the platform. A second dolly 600.2 with a deflated airbag stack 400 may be positioned beneath the wing 1004 that needs to be raised in order to stabilize the aircraft for transport. As shown in FIG. 12, when the airbag stack 400 is inflated, aircraft 1000 is balanced and may be safely transported. To facilitate moving the aircraft without having the airbags dislodged, the airbag stack 400 may be secured to wing 1002 with one or more straps 1202 secured about wing 1002. Tow vehicles 1202.1, 1202.2 may be configured to receive tow bars 702.1, 702.2. With the tow bars attached, tow vehicles may tow and direct dollies 600.1, 600.2, thereby repositioning disabled aircraft 1000 to a preferable location such as a hangar or other facilities used to repair disabled aircraft. In some embodiments, a tow vehicle may be configured to receive tow bars from multiple dollies at the same time, thereby permitting a single tow vehicle to pull the dollies and the aircraft to a new location.

Figures 13, 14:
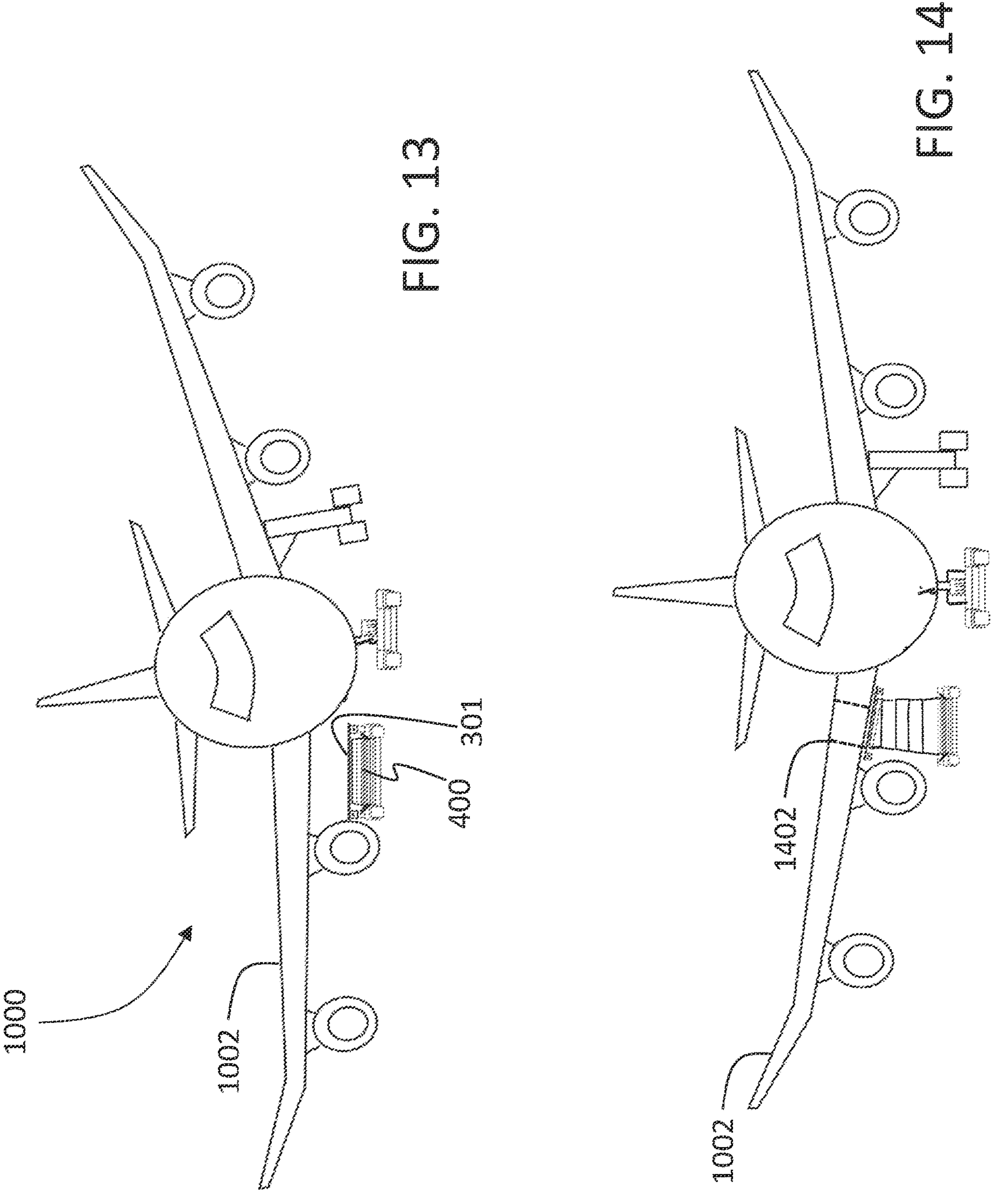
FIG. 13 is a view of the disabled aircraft with a collapsed or undeployed landing gear.
FIG. 14 is a view of the disabled aircraft of FIG. 10 with a dolly having lifting airbags and a lifting plate and with a dolly for receiving the front landing gear with a flat tire.
Figure 15:
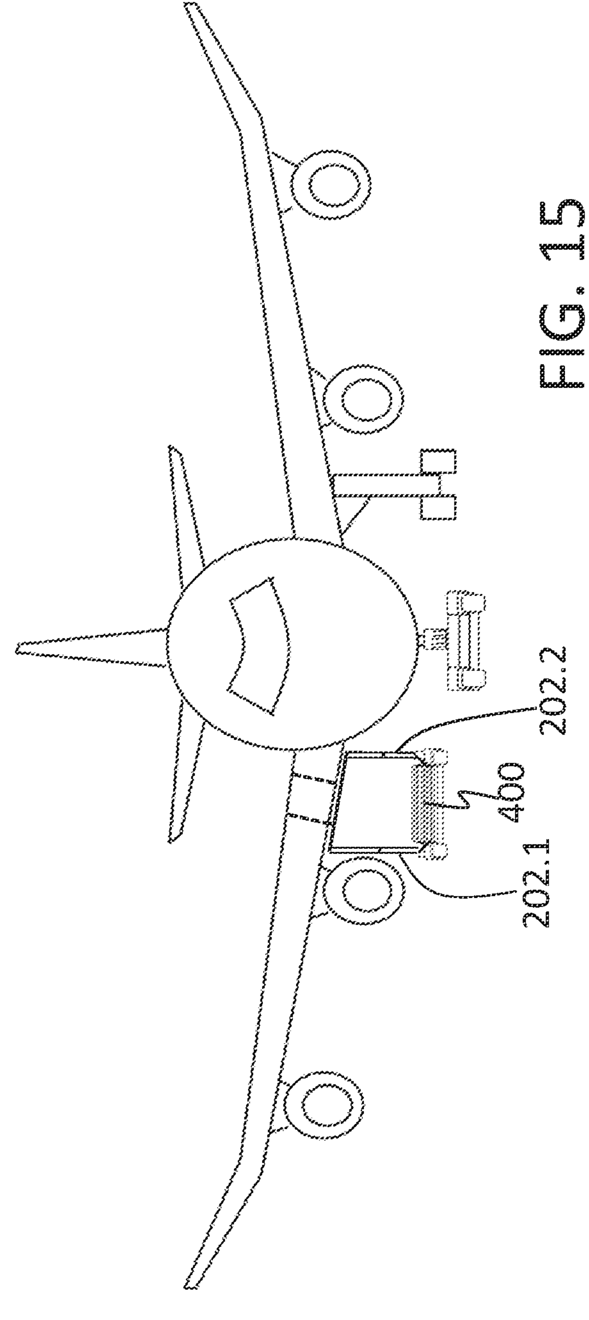
FIG. 15 is a view of the disabled aircraft of FIGS. 10 and 11 with the wing lifted and supported by posts extending from the dolly with the airbags deflated.

In some embodiments, as depicted in FIGS. 13-15, airbag stack may be used to raise the disabled aircraft 1000 and position it upon a rigid support assembly for transit. To erect the rigid support assembly, the airbag structure 400 may be inflated with the support platform 300 laying atop the stack of airbags such that when the aircraft is lifted, the platform will be held against the aircraft by the airbags. Once the aircraft is lifted, the support legs may be set into place, as shown in FIG. 14. Platform 301 may be further secured to the wing 1002 by straps 1402. Support legs 202 may then be inserted and affixed at one end to the platform and at the opposite end to the dolly. As shown, first support leg 202.1 is longer than second support leg 202.2, causing the platform to angle to match the pitch of the wing where the wing rests upon the platform. When the legs and platform are secured to one another with fasteners, airbags 400 may be deflated allowing the aircraft to be supported exclusively by the rigid support assembly. In embodiments, the rigid support assembly and the airbag stack, both on the dolly, may share the weight load of the aircraft. With the aircraft leveled and supported, it may be towed to an area that is not blocking other aircraft and is more conducive to repairs. Other rigid adjustable height support structures may be utilized other than telescoping posts, for example scissor mechanisms, posts with ratchet mechanisms, and integrated telescoping expanding posts. In embodiments the lifting means may use conventional mechanical lifting mechanisms in conjunction with or not with a pneumatic lifting means. In embodiments, adjustable height rigid support structure and a non-pneumatic lifting means may include hydraulic cylinders or pneumatic cylinders. See for example, U.S. patents and Publications U.S. Pat. No. 8,733,508; 2009/0278098, both incorporated by reference for all purposes. In embodiments, the lifting means and rigid adjustable height support structures may be a single integrated unit that is placeable on and removable from a dolly.

Figures 16, 17:
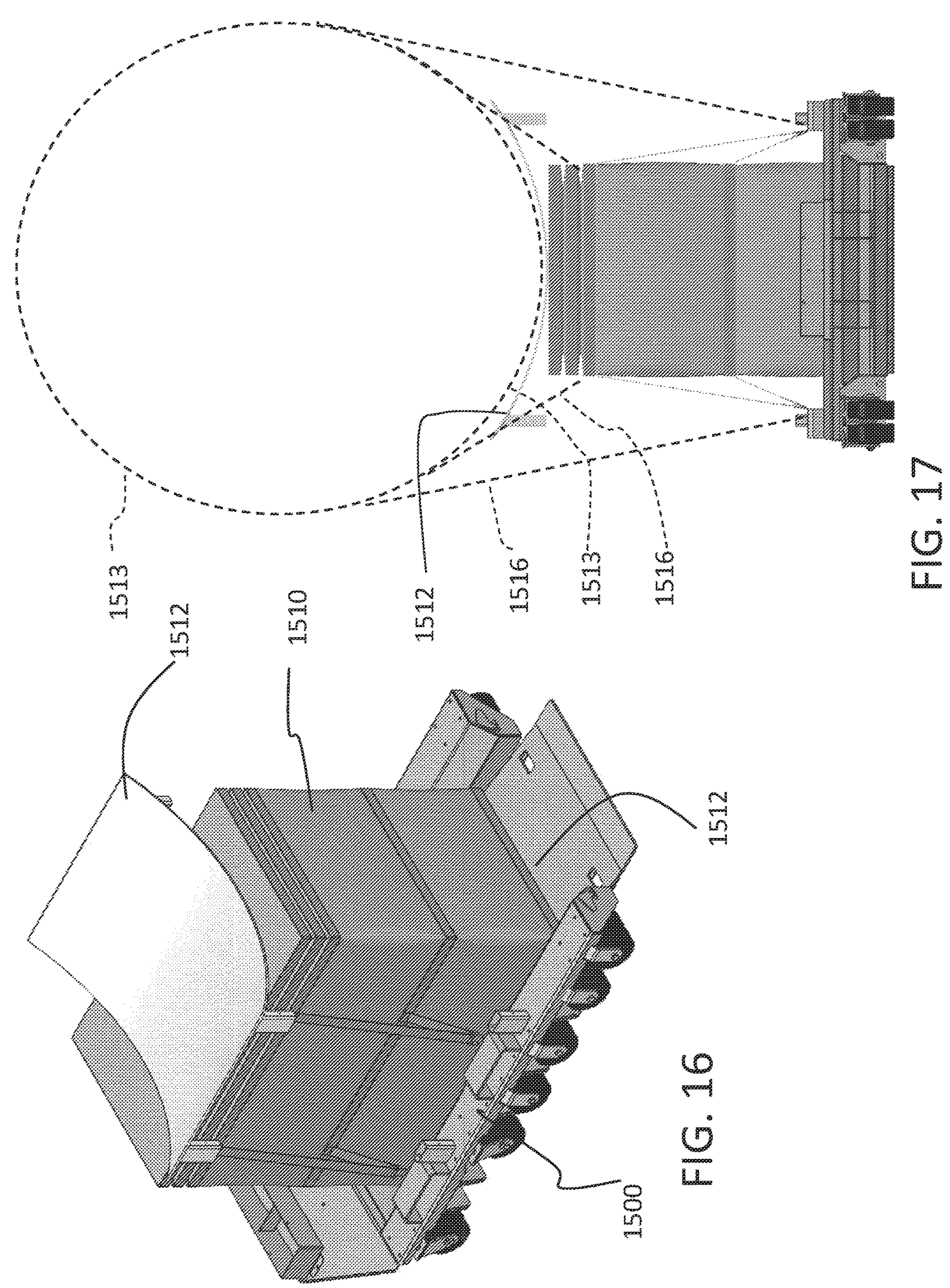
FIG. 16 is a perspective view of a dolly with the lifting airbags in the bed region and a carriage on the top of the airbag stack.
FIG. 17 is a rear elevational view of the dolly and carriage of FIG. 16 also illustrating positioning of the dolly below an aircraft fuselage with securement lines.

Referring to FIGS. 16-19, a dolly 1500 with the lowered bed 1504 has an airbag stack 1510 therein with a carriage 1512 on the top of the stack. The stack has been raised to a position such that it could be engaging with a bottom facing portion 1513 of a fuselage 1514. FIG. 17 depicts the carriage holding the fuselage 1514 of an aircraft. Securement lines 1516, such as strapping, can secure the fuselage to the dolly, stack of airbags, and/or the support structure 1512 configured as a carriage.

Figures 18, 19:
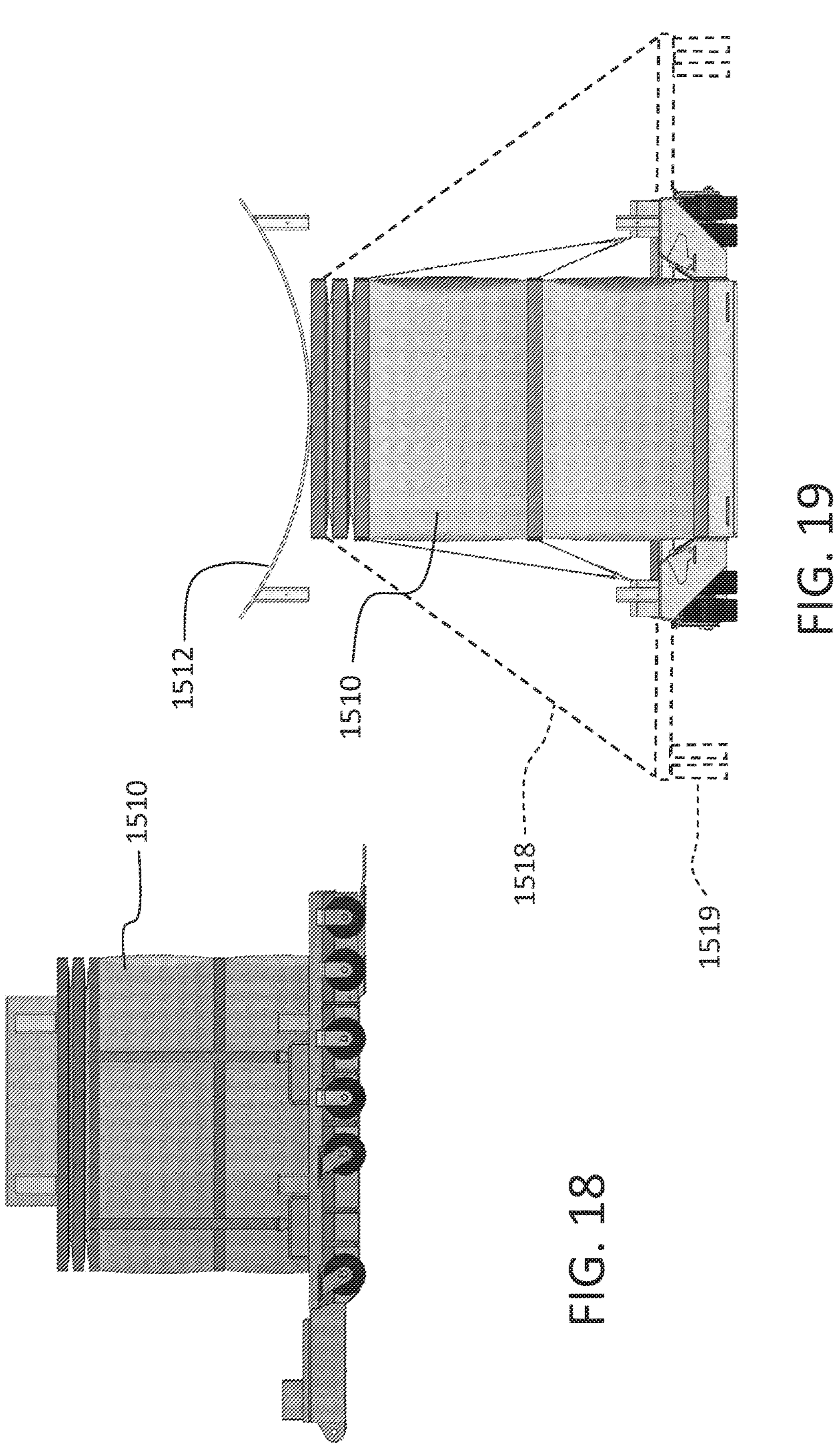
FIG. 18 is a side elevational view of the dolly and carriage of FIGS. 16 and 17.
FIG. 19 is a front elevational view of the dolly and carriage of FIGS. 16-18 further illustrating support members and securement lines for stabilizing the airbag stack.
Figures 20, 21:
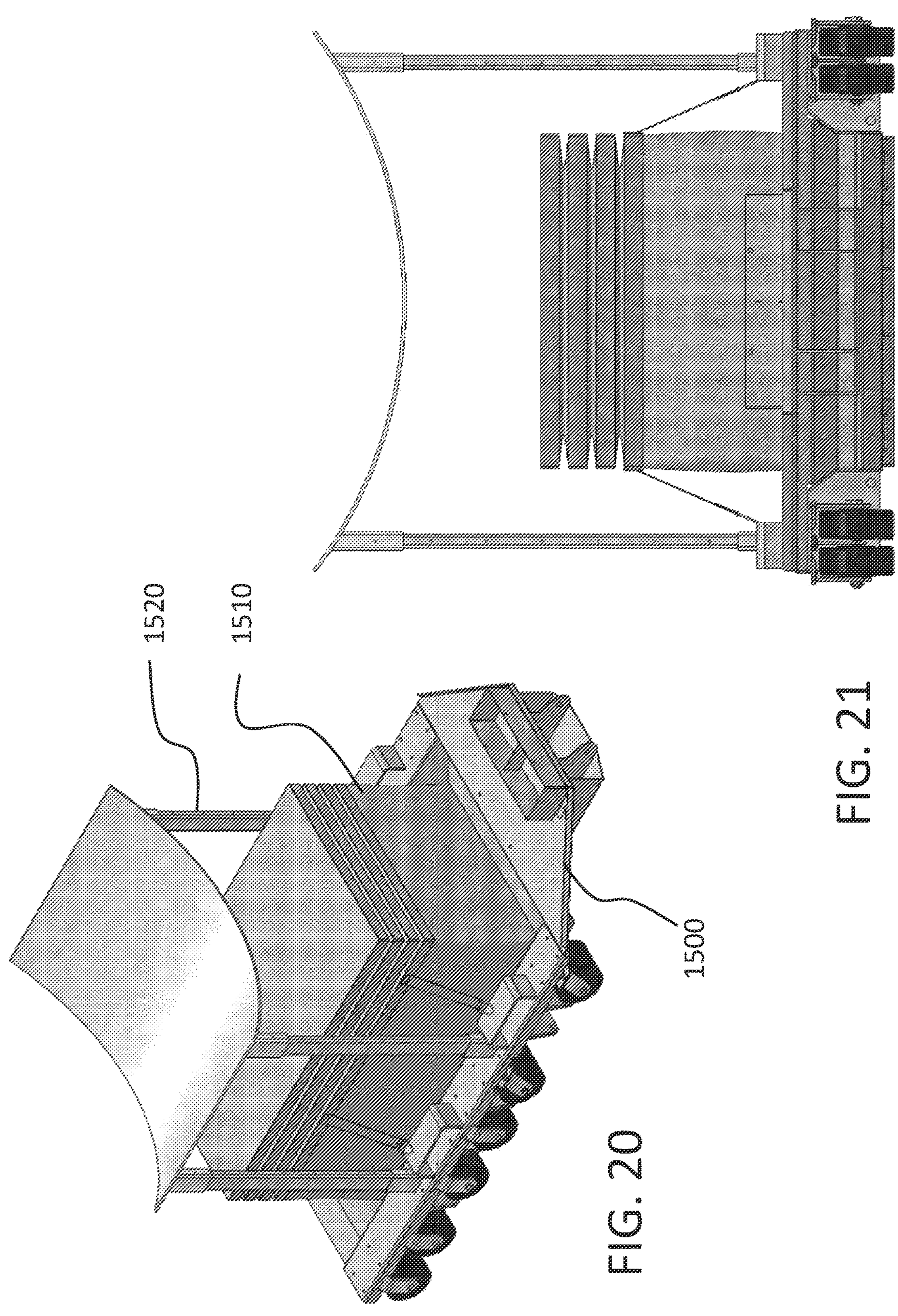
FIG. 20 is a perspective view of the dolly of FIGS. 16-19 with the adjustable height rigid support structure on the dolly connected to the carriage, and with the airbag stack lowered by deflation.
FIG. 21 is a rear elevational view of the dolly, airbag stack, and rigid support structure with the carriage of FIG. 20.
Figure 23:
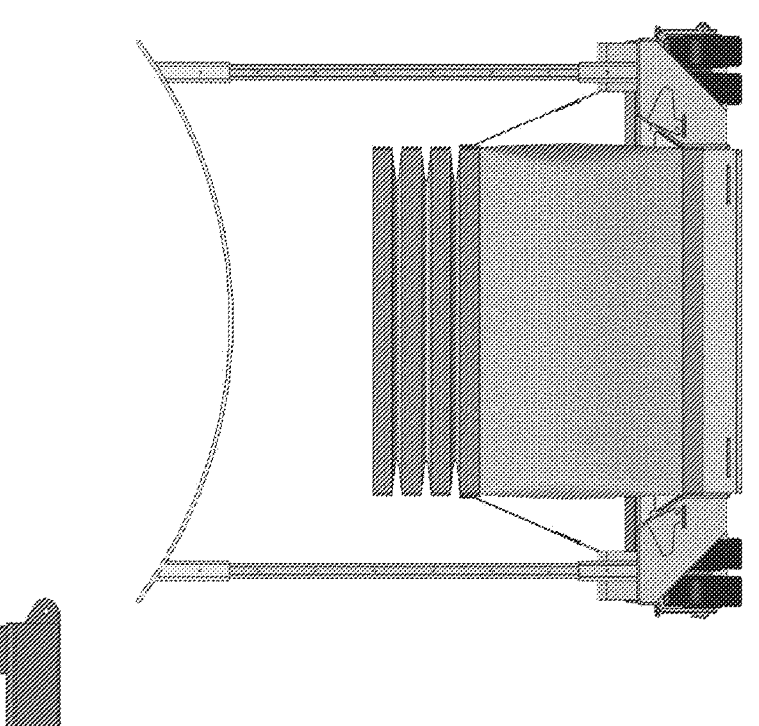
FIG. 23 is a rear elevational view of the dolly, airbag stack, and rigid support structure with the carriage of FIGS. 20-22.
Figure 22:
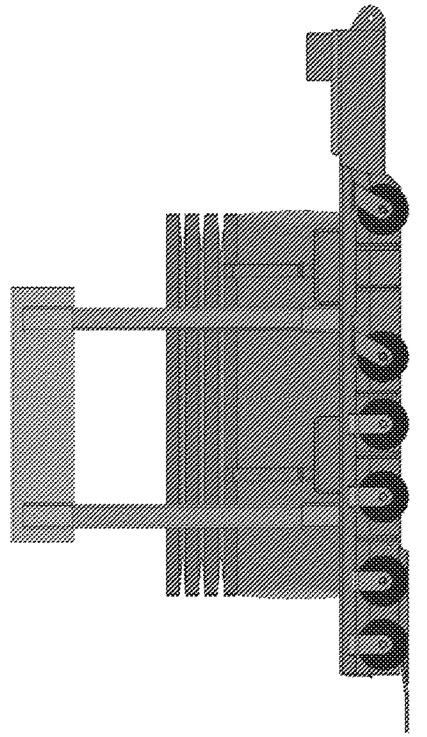
FIG. 22 is a rear elevational view of the dolly, airbag stack, and rigid support structure with the carriage of FIGS. 20 and 21.

FIG. 19 illustrates laterally extending support members 1518 that provide laterally displaced anchor locations for stabilizing lines 1517 for enhancing the stability of the stack of airbags 1510. The support members may be pivotally attached, or removable attached to the frame of the dolly. The support members may have ground engaging members such as wheels configures as castors 1519.

FIGS. 20-23 depicts the dolly 1500 with the adjustable height rigid support structure 1520 put in place on the side beams 1522 to carry the load of the disabled aircraft seated in the carriage. The airbag stack 1510 has been lowered by deflation such that the load of the air craft would be carried exclusively by the rigid support structure on the dolly. In embodiments, the adjustable height rigid support can also provide stability to the airbag stack by being positioned directly adjacent to the sides of the stack.

Figures 24, 25, 26, 27:
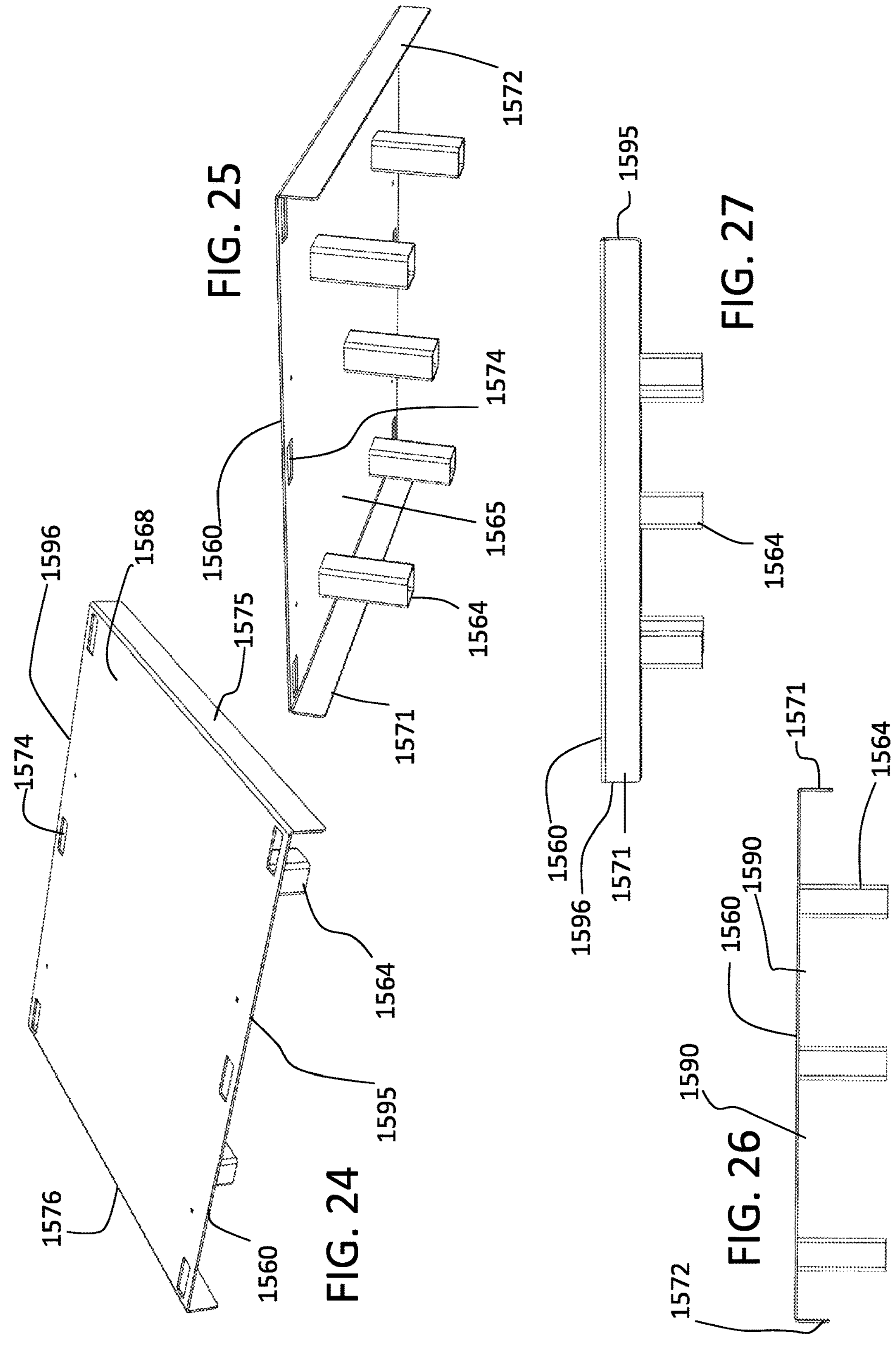
FIG. 24 is a top perspective view of a support platform in accord with embodiments.
FIG. 25 is a bottom perspective view of the support platform of FIG. 24.
FIG. 26 is a side elevation view of the support platform of FIG. 24.
FIG. 27 is an end elevation view of the support platform of FIG. 24.

Referring to FIGS. 24-31, a side beam bridging support platform 1560 is depicted that cooperates with a dolly 1500. Referring in particular to FIGS. 24-27, the bridging support platform having legs 1564 welded to the bottom side 1565 of the upper plate 1568 and positioned to sit on the recessed bed between the side beams 102, 104 of dollies as disclosed herein. The legs 1564 may comprise square steel tubing. The positioning of the legs, as illustrated in FIG. 25 may be such that the outer legs may contact and are constrained by the side beams 102, 104. Similarly, the forward legs may contact and be constrained by the forward structure 1570. Forward and rearward downwardly extending lips folded portions defining lips 1571, 1572 at forward and rearward ends 1575, 1576 of the support platform. The support platform 1560 providing fork lift slots 1590, 1591 at lateral sides 1595, 1596. Apertures 1574 may be provided as tie downs for lines such as straps, cables or the like for supporting airbag stacks or other equipment, and can also perform as manual lifting handles.

Figures 28A, 28B, 28C:
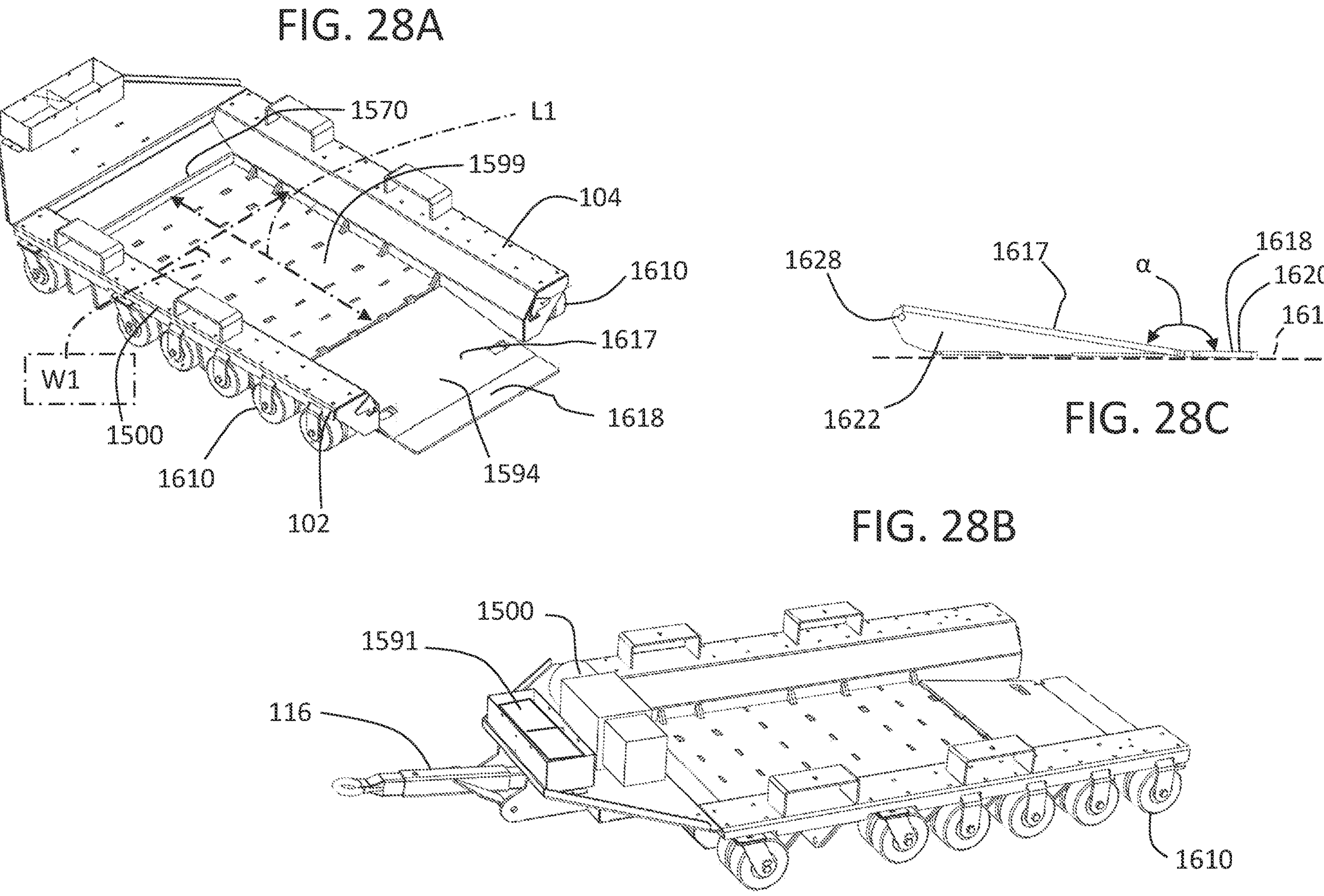
FIG. 28A is a perspective view of a dolly.
FIG. 28B is another perspective view of the dolly of FIG. 28A with a tow bar.
FIG. 28C is a side elevation view of the ramp separated from the dolly.
Figures 29A, 29B, 30, 31:
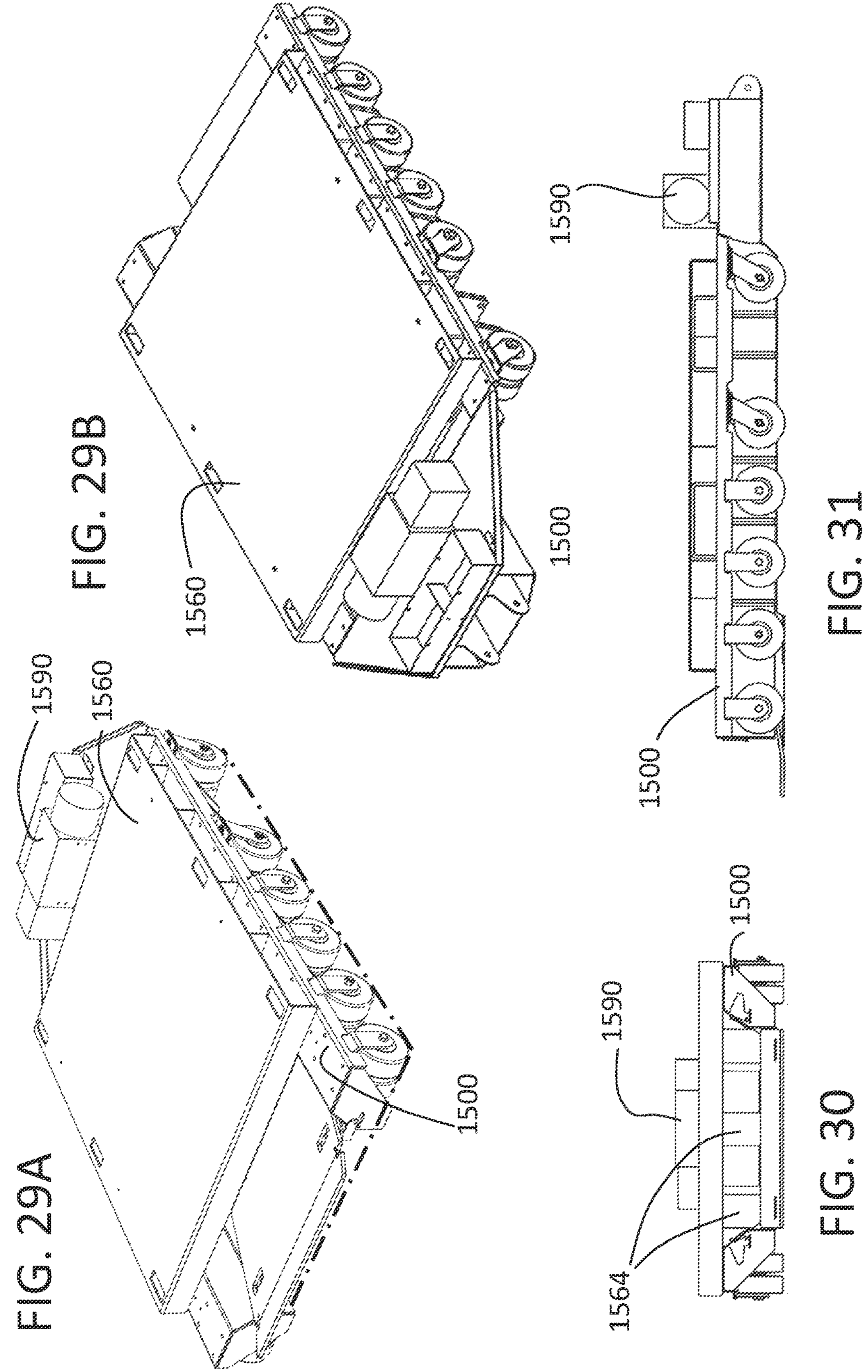
FIG. 29A is a perspective view of a dolly system with a beam bridging platform thereon.
FIG. 29B is a another perspective view of the dolly system of FIG. 29A.
FIG. 30 is a rear elevation view of the dolly system of FIG. 29B.
FIG. 31 is a side elevation view of the dolly system of FIG. 29B.

Referring to FIGS. 28A-31, the dolly 1500 is particularly suited for high loads, having twelve castors 1610, six on each side, a double-walled bed platform 1614 with cross-members 1615 welded to each bottom plate, and having a ramp 1594 extending into the dolly bed platform 1599. The ramp having two upwardly facing planar plate portions, a proximal plate portion 1617, and a distal plate portion 1618, that are unitary and have an angle $\alpha$ measured from above the plate portions of about 169° to 173°. In embodiments, angle $\alpha$ is from 164° to 176°. In embodiments, the distal plate portion 1618 lays flat on the surface 1619 that the dolly is on, with its upper surface 1620 parallel to the surface that the ramp rests upon. This allows the aircraft wheel easier initial entry upon the ramp than if it was immediately confronting the angled ramp portion. The proximal plate portion may also have reinforcing structure 1622 that engages or closely confronts the surface 1619. The distal surface acts as a brake to the dolly when in the lowered position as shown in FIGS. 28A-28C. The ramp pivots at pivot point 1628 and is raisable to the raised position as shown in FIG. 29A. The castors 1610 as depicted have four swivel castors mounted in the two forward castor positions and eight non-swivel castors rearwardly. The frame of the dolly may have a slight concave curvature facing downward such that in an unloaded state, the castors that are not positioned most forwardly or most rearwardly may be slightly raised above the surface upon which the dolly rests. Upon significant loading the dolly frame may slightly flex wherein these castors engage the surface. Referring to FIG. 29A, in embodiments, the castors define, by their contact points, a rectangular dolly footprint 1631 on the surface that the dolly rests of about 50×55 inches, or a total footprint area of about 19 square feet. In embodiments, the castors provide a dolly footprint, by their contact points, in the range of about 17 square feet to about 22 square feet. In embodiments, the castors provide a footprint 1631, by their contact points, in the range of about square feet to about 24 square feet. In embodiments, the width W1 of the dolly bed platform 1599 is about 45 inches. In embodiments, the width of the dolly bed platform 1599 is in the range of about 40 inches to about 50 inches. In embodiments, the length L1 of the dolly bed platform 1599 is about 51 inches, not including the ramp 1594. In embodiments, the length of the dolly bed platform 1599 is in the range of about 46 inches to about 58 inches.

Figures 32, 33:
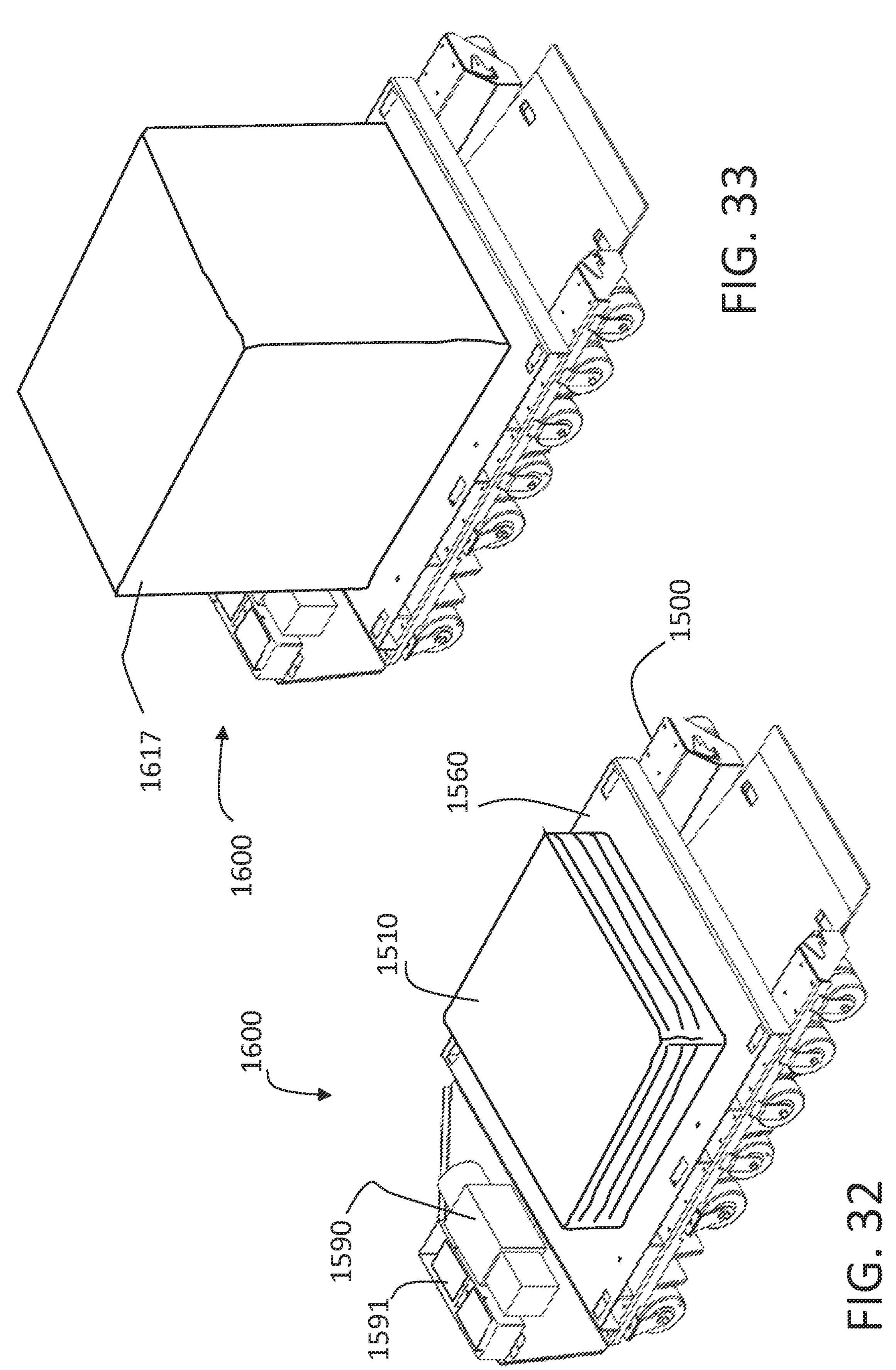
FIG. 32 is a perspective view of a dolly system including a support platform and an airbag stack thereon.
FIG. 33 is a perspective view of a dolly system with a generic support block.

Referring to FIGS. 32 and 33, a dolly system 1600, comprises a dolly 1500, a support platform 1560, and an airbag stack 1510. The dolly 1500 has side beams 102, 104 with a recessed bed, a winch 1590 and batteries 1591 for powering the winch. Airbag stack 1510 is a standard size of 48 inches by 48 inches and is erectable to about eight feet and has a lift capacity of about 33,000 lbs. The support platform effectively distributes the weight of the lift to the double wall lower platform 1599. FIG. 33 illustrates a generic structure 1617 which may be a suitable component in the collective set of components 420 providing for emergency use in removing disabled aircraft from runways or other non suitable places for disabled aircraft at airports. Such structure may be non collapsible and/or provide some cushioning with a soft exterior but with a suitable internal framework for carrying high loads, such as supporting an aircraft. The dolly with and without the support platform is suitable for hauling and positioning such components.

The following additional references are hereby incorporated by reference herein in their entirety, except for express definitions and patent claims contained therein: U.S. Pat. No. 1,248,896 to Olson; U.S. Pat. No. 2,362,981 to Baum; U.S. Pat. No. 2,392,409 to Ray; U.S. Pat. No. 2,608,312 to Day; U.S. Pat. No. 3,583,723 to Nowell, et al.; U.S. Pat. No. 3,586,187 to Wright; U.S. Pat. No. 3,598,259 to Wright; U.S. Pat. No. 3,720,422 to Nelson; U.S. Pat. No. 3,946,886 to Robinson et al.; U.S. Pat. No. 4,690,605 to Coccaro; U.S. Pat. No. 4,854,803 to Coccaro; U.S. Pat. No. 5,071,151 to Irwin; U.S. Pat. No. 6,286,813 to Coccaro; U.S. Pat. No. 7,070,167 to Bacon; U.S. Pat. No. 7,097,406 to Gang; U.S. Pat. No. 8,475,108 to Hamman; U.S. Patent Application Publication No. 2014/0037409 to Winters; and U.S. Pat. App. Pub. No. 2018/0273360 to Nasrin. See also "Towbar Model TY-TB-FTD", The Brackett Aircraft Company, Inc., Kingman, AZ, USA; and "NFE-4 Aircraft Tug", AIRTUG®, Avon, OH, USA.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The above disclosure is related to the detailed technical contents and inventive features thereof. People skilled in this field may proceed with a variety of modifications and replacements based on the disclosures and suggestions of the invention as described without departing from the characteristics thereof. For example, although a plurality of adjustable stops as shown are useable with each of the embodiments, it is additionally or alternatively contemplated to leave the aircraft tightly secured in place with the winch and strap during towing. Although many such modifications and replacements are not fully disclosed in the above description, they have substantially been covered by the spirit and technical theory of the subject invention.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A dolly system for lifting an aircraft from underneath the aircraft, comprising:

a dolly comprising: a steel frame including a pair of side beams that are substantially parallel to each other and a platform extending between the pair of beams defining a lower bed region, and a plurality of castors attached to each of said pair of beams;

the dolly system further comprising a pneumatic lifting system comprising an inflatable vertically erectable airbag stack of one or more airbags;

the dolly system further comprising a platform removably placeable on the dolly, the platform having an upper plate portion that spans between the pair of side beams and spans most of a forward backward length of the pair of beams, the platform further comprising a plurality of legs that extend downwardly from the upper plate portion to seat on the lower bed region, and wherein the the inflatable vertically erectable airbag stack sits on an upper surface of the upper plate portion.

2. The dolly system of claim 1, wherein the platform has a pair of lateral margins positioned above the pair of side beams, the platform having a plurality of cutouts at each of the pair of lateral margins and further has a forward margin and rearward margin, the platform having a respective downwardly extending lip at each of the forward and rearward margins, and wherein the platform seats on each of the pair of side beams and wherein each of the plurality of legs are displaced inwardly from the lateral margins.

3. A dolly system for lifting an aircraft from underneath the aircraft, comprising:

a dolly comprising: a steel frame including a pair of side beams that are substantially parallel to each other and a platform extending between the pair of beams defining a lower bed region, and a plurality of castors attached to each of said pair of beams;

the dolly system further comprising a pneumatic lifting system comprising an inflatable vertically erectable airbag stack of one or more airbags;

wherein the plurality of castors attached to each of said pair of beams comprise four castors on each beam with at least one of said four castors being a swivel castor, and wherein the plurality of castors define a rectangular footprint on a surface below the dolly of at least about 50 inches by 55 inches.

4. The dolly system of claim 3, further comprising a plurality of strap retainers at the dolly for receiving a plurality of airbag retaining straps, and wherein the inflatable vertically erectable airbag stack comprises a plurality of straps extending from an upper portion of the vertically erectable airbag stack when the airbag stack is erected.

5. The dolly system of claim 4, wherein the plurality of straps are anchored to a plurality of support members that extend laterally outward from the pair of side beams.

6. The dolly system of claim 3, wherein each of the pair of beams comprises a plurality of receiving brackets for accepting an adjustable height rigid support structure, and the dolly further comprises an adjustable height rigid support structure.

7. The dolly system of claim 6, wherein the adjustable height rigid support structure further comprises a support platform for the top of the rigid support structure.

8. The dolly system of claim 7, wherein the support platform is attachable and detachable to a left and a right side of the rigid support structure and the support platform has a curvature for receiving a fuselage of the aircraft.

9. A system for raising and towing a disabled aircraft stored together at an airport for rapid deployment during an emergency, the system comprising:

a first aircraft dolly having a tow bar;

vertically erectable airbag stack on the first aircraft dolly;

a compressor;

an air hose for connecting between the compressor and the airbag stack; and an adjustable height rigid support structure attachable to the first aircraft dolly, wherein the adjustable height rigid support structure comprises at least four telescoping legs, the first aircraft dolly being configured to receive a lower portion of each of the at least four telescoping legs; and an aircraft support platform for the top of each of the at least four legs.

10. The system of claim 9, wherein the aircraft support platform is arcuate for conformingly receiving a fuselage of a disabled aircraft.

11. A kit for moving a disabled aircraft, the kit comprising:

a plurality of dollies, each dolly having a U-shaped steel framework and a lowered bed platform supported by the U-shaped framework, wherein a forward portion of the frame of one of the plurality of dollies has a winch and battery mounted thereon;

a plurality of towbars;

a pneumatic lifting system comprising an air bag stack placeable on one of the plurality of dollies, a compressor; and connecting hose; and strapping for attachment to the disabled aircraft.

12. The kit of claim 11, further comprising a beam bridging support platform for placement on the beams of the one of the plurality of dollies, the beam bridging support platform having legs for engaging the lowered bed platform.

13. The kit of claim 12, wherein the airbag stack has a footprint of about 48 inches by 48 inches, plus or minus two inches, and seats upon the beam bridging support platform.

14. The kit of claim 11, further comprising a lifting plate that seats on top of the airbag stack.

15. The kit of claim 11, further comprising an adjustable height rigid support structure attachable to the one of the plurality of dollies, adjustable height rigid support structure that extends upwardly about the airbag stack.

16. The kit of claim 11, further comprising means for stabilizing the airbag stack when said is in an inflated state supporting the aircraft.

17. The kit of claim 11, further comprising a carriage with a curvature for placement at the top of the airbag stack.

18. The kit of claim 11, wherein the U-shaped framework of one of the plurality of dollies comprises two side beams and each of the two side beams four or more castors attached thereto.

19. The kit of claim 18, wherein each of the four or more castors comprises at least one swivel castor and at least one non swivel castor.

20. The system of claim 9, wherein the first aircraft dolly has a framework with a pair of side beams, and each side beam has four or more castors attached thereto.

* * * * *